US012684668B2

(12) United States Patent
Yang et al.

(10) Patent No.: US 12,684,668 B2
(45) Date of Patent: Jul. 14, 2026

(54) LIGHT-EMITTING ELEMENT DRIVING CIRCUIT AND LIGHT-EMITTING ELEMENT DRIVING CHIP

(71) Applicant: SUZHOU NOVOSENSE MICROELECTRONICS CO., LTD., Suzhou (CN)

(72) Inventors: Qingshan Yang, Suzhou (CN); Qingjie Ma, Suzhou (CN); Jiexiu He, Suzhou (CN); Yun Sheng, Suzhou (CN)

(73) Assignee: SUZHOU NOVOSENSE MICROELECTRONICS CO., LTD., Suzhou (CN)

( * ) Notice: Subject to any disclaimer, the term of this patent is extended or adjusted under 35 U.S.C. 154(b) by 133 days.

(21) Appl. No.: 18/857,343

(22) PCT Filed: Apr. 19, 2023

(86) PCT No.: PCT/CN2023/089225
§ 371 (c)(1),
(2) Date: Oct. 16, 2024

(87) PCT Pub. No.: WO2023/202619
PCT Pub. Date: Oct. 26, 2023

(65) Prior Publication Data

US 2026/0190195 A1 Jul. 2, 2026

(30) Foreign Application Priority Data

Apr. 20, 2022 (CN) ........................ 202210418984.X
Nov. 17, 2022 (CN) ........................ 202223090989.9

(51) Int. Cl.
*H05B 45/46* (2020.01)

(52) U.S. Cl.
CPC .................................... *H05B 45/46* (2020.01)

(58) Field of Classification Search
CPC ........ H05B 45/46; H05B 45/48; H05B 45/30; H05B 45/345; H05B 45/37; H05B 45/38
See application file for complete search history.

(56) References Cited

U.S. PATENT DOCUMENTS

2012/0217900 A1 8/2012 Kanamori et al.
2015/0130363 A1 5/2015 Lee et al.
2015/0305105 A1* 10/2015 Yang ..................... H05B 47/10 315/307

FOREIGN PATENT DOCUMENTS

CN 202617454 U 12/2012
CN 102905443 A 1/2013
(Continued)

OTHER PUBLICATIONS

Jiang et al., English translation of CN109951925A (Year: 2019).*
The International Search Report (PCT/ISA/210) issued in PCT/CN2023/089225, mailed on Jun. 25. 2023.

*Primary Examiner* — Daniel D Chang
(74) *Attorney, Agent, or Firm* — Birch, Stewart, Kolasch & Birch, LLP

(57) ABSTRACT

The present application discloses a light-emitting element driving circuit and a light-emitting element driving chip. The light-emitting element driving circuit includes a driving power supply stage and an impedance-adjustable module arranged on a branch where a light-emitting element is located, and an impedance adjusting branch connected in parallel with the driving power supply stage, wherein an adjustment output terminal of the impedance adjusting branch is coupled to the impedance-adjustable module; and the impedance adjusting branch is configured to adjust an impedance of the impedance-adjustable module according to voltages on both sides of the driving power supply stage. The light-emitting element driving circuit provided by the present application can improve a voltage drop at the driving (Continued)

power supply stage, balance the power consumption and heat generation of the driving circuit itself, and enhance the driving ability of the circuit.

15 Claims, 6 Drawing Sheets

(56) References Cited

FOREIGN PATENT DOCUMENTS

| | | | | |
|---|---|---|---|---|
| CN | 103257662 | A | | 8/2013 |
| CN | 106028509 | A | | 10/2016 |
| CN | 109951925 | A | * | 6/2019 |
| CN | 211656110 | U | | 10/2020 |
| CN | 114828334 | A | | 7/2022 |
| EP | 0 944 186 | A2 | | 9/1999 |
| JP | 2016-201337 | A | | 12/2016 |

* cited by examiner

LIGHT-EMITTING ELEMENT DRIVING CIRCUIT AND LIGHT-EMITTING ELEMENT DRIVING CHIP

The present application claims priority to Chinese Invention patent application No. 202210418984.X, filed on Apr. 20, 2022 and entitled "LIGHT-EMITTING ELEMENT DRIVING CIRCUIT, AN APPARATUS AND ELECTRIC DEVICE", and to Chinese Utility Model patent application No. 202223090989.9, filed on Nov. 17, 2022 and entitled "LIGHT-EMITTING ELEMENT LOW-SIDE DRIVING CIRCUIT, CHIP AND ELECTRIC DEVICE", the disclosures of which are herein incorporated by reference in their entireties.

TECHNICAL FIELD

The present application relates to the field of electronic circuit technologies, in particular to a light-emitting element driving circuit and a light-emitting element driving chip.

BACKGROUND

The prior art provides a light-emitting element driving circuit as shown in FIG. 1, which includes a DC power supply 11, a driving chip 12 and a light-emitting element 13 that are connected in series with each other, wherein electric energy generated by the DC power supply 11 is converted into an appropriate constant current through the driving chip 12 and is transmitted to one light-emitting element 13 or a plurality of light-emitting elements 13 connected in series with each other at a back-end circuit so as to drive the light-emitting element. In order to ensure a constant current output, a voltage difference between an input terminal and an output terminal of the driving chip 12 needs to be greater than a certain value. However, duc to a fluctuation and deviation in a forward voltage drop of the light-emitting element, a sufficient voltage margin needs to be reserved for the setting of an output voltage of the power supply 11. However, limited by a heat dissipation capacity of chip package, the heating caused by the above-mentioned voltage margin and own power consumption of the driving chip 12 generated by a constant current outputted therefrom is difficult to dissipate from the chip, and the driving circuit of the light-emitting element provided in the prior art are prone to the problems of large own power consumption, high heat generation and limited driving capacity.

SUMMARY

One of objects of the present application is to provide a light-emitting element driving circuit to solve technical problems of large own power consumption, high heat generation and limited output current capacity of the light-emitting element driving circuit in the prior art.

One of objects of the present application is to provide a light-emitting element driving chip.

To fulfill one of above objects of the present application, an embodiment of the present application provides a light-emitting element driving circuit. The light-emitting element driving circuit includes a driving power supply stage and an impedance-adjustable module arranged on a branch where a light-emitting element is located, and an impedance adjusting branch connected in parallel with the driving power supply stage, wherein an adjustment output terminal of the impedance adjusting branch is coupled to the impedance adjustable module; and the impedance adjusting branch is configured to adjust an impedance of the impedance-adjustable module according to voltages on both sides of the driving power supply stage.

In an embodiment of the present application, the impedance adjusting branch is configured to: in response to a voltage drop at the driving power supply stage being greater than a predetermined compensation voltage value, adjust the impedance of the impedance-adjustable module to increase; and/or the impedance adjusting branch is configured to: in response to the voltage drop at the driving power supply stage being less than a predetermined compensation voltage value, adjust the impedance of the impedance-adjustable module to decrease.

In an embodiment of the present application, the voltage drop at the driving power supply stage is a difference between a voltage value of a driving input terminal of the driving power supply stage and a voltage value of a driving output terminal of the driving power supply stage; the impedance adjusting branch is configured to: in response to the voltage drop at the driving power supply stage being greater than a predetermined compensation voltage value, adjust the impedance of the impedance-adjustable module to increase continuously until the difference between the voltage value of the driving input terminal and the voltage value of the driving output terminal approximates to the compensation voltage value; and the impedance adjusting branch is configured to: in response to the voltage drop at the driving power supply stage being less than a predetermined compensation voltage value, adjust the impedance of the impedance-adjustable module to decrease continuously until the difference between the voltage value of the driving input terminal and the voltage value of the driving output terminal approximates to the compensation voltage value.

In an embodiment of the present application, the impedance-adjustable module comprises a shunting module and a variable resistance module that are connected in parallel with each other.

In an embodiment of the present application, the adjustment output terminal is coupled to an adjustment control terminal of the variable resistance module; and the impedance adjusting branch is configured to adjust an impedance of the variable resistance module according to the voltages on both sides of the driving power supply stage.

In an embodiment of the present application, the impedance adjusting branch is configured to: in response to the voltage drop at the driving power supply stage being greater than a predetermined compensation voltage value, adjust an impedance of the variable resistance module to increase; and/or the impedance adjusting branch is configured to: in response to the voltage drop at the driving power supply stage being less than a predetermined compensation voltage value, adjust the impedance of the variable resistance module to decrease.

In an embodiment of the present application, the impedance adjusting branch comprises a compensation circuit and an error amplification circuit; an output terminal of the error amplification circuit is coupled to the impedance-adjustable module; a first input terminal of the error amplification circuit is coupled between the driving power supply stage and the light-emitting element through the compensation circuit, and a second input terminal of the error amplification circuit is coupled to the other terminal of the driving power supply stage that is not coupled with the light-emitting element; and the compensation circuit is configured to compensate a compensation voltage of the driving power supply stage.

In an embodiment of the present application, the light-emitting element driving circuit further comprises a sampling circuit, wherein the error amplification circuit is coupled to a point between the driving power supply stage and the light-emitting element through the compensation circuit and the sampling circuit; the sampling circuit is configured to collect an extremum voltage value at a node between the driving power supply stage and the light-emitting element; and the compensation circuit is configured to compensate the extremum voltage value according to the compensation voltage.

In an embodiment of the present application, when the light-emitting element is coupled to the driving input terminal of the driving power supply stage, the sampling circuit is configured to collect a sampling voltage with a minimum voltage value at the driving input terminal; the compensation circuit is configured to negatively compensate the sampling voltage according to the compensation voltage; and when the light-emitting element is coupled to the driving output terminal of the driving power supply stage, the sampling circuit is configured to collect a sampling voltage with a maximum voltage value at the driving output terminal; and the compensation circuit is configured to positively compensate the sampling voltage according to the compensation voltage.

In an embodiment of the present application, the impedance-adjustable module is connected between a power supply and a driving input terminal of the driving power supply stage, and the light-emitting element is connected between a driving output terminal of the driving power supply stage and ground; the compensation circuit comprises a first N-type transistor, a first P-type transistor and a compensation resistor; and a gate of the first N-type transistor is coupled to the sampling circuit, a drain of the first N-type transistor is coupled to the power supply, and a source of the first N-type transistor is coupled to a gate of the first P-type transistor; and a drain of the first P-type transistor is grounded, and a source of the first P-type transistor is coupled to the error amplification circuit through the compensation resistor.

In an embodiment of the present application, the impedance-adjustable module is connected between the driving output terminal of the driving power supply stage and the ground, and the light-emitting element is connected between the power supply and the driving input terminal of the driving power supply stage; the compensation circuit comprises a first P-type transistor, a first N-type transistor and a compensation resistor; and a gate of the first P-type transistor is coupled to the sampling circuit, a drain of the first P-type transistor is grounded, and a source of the first P-type transistor is coupled to a gate of the first N-type transistor; and a drain of the first N-type transistor is coupled to a power supply, and a source of the first N-type transistor is coupled to the error amplification circuit through the compensation resistor.

In an embodiment of the present application, the sampling circuit comprises an output transistor, a first input transistor, a second input transistor, a first mirror branch and a second mirror branch; the first input transistor and the second input transistor are connected in parallel with each other and are connected with the first mirror branch, and the output transistor is connected with the second mirror branch; and a control terminal of the first input transistor is connected to a first driving branch of the driving power supply stage, and a control terminal of the second input transistor is connected to a second driving branch of the driving power supply stage.

In an embodiment of the present application, a plurality of light-emitting elements is provided to form at least a first light-emitting branch and a second light-emitting branch which are connected in parallel with each other; the driving power supply stage comprises at least a first driving branch and a second driving branch; the first light-emitting branch is coupled to the first driving branch to form a first channel, and the second light-emitting branch is coupled to the second driving branch to form a second channel; and the first channel and the second channel are connected in parallel.

In an embodiment of the present application, the light-emitting element driving circuit further comprises a current control circuit and a configuration resistor, wherein a control output terminal of the current control circuit is connected to the first driving branch and the second driving branch, and the configuration resistor is connected between a configuration input terminal of the current control circuit and ground.

To fulfill one of above objects of the present application, an embodiment of the present application provides a light-emitting element driving chip, including the light-emitting element driving circuit provided by one of the above technical solutions, wherein the impedance-adjustable module includes a shunting module and a variable resistance module; the light-emitting element driving chip further includes a substrate; the variable resistance module, the driving power supply stage and the impedance adjusting branch are arranged on the substrate; the shunting module is arranged outside the substrate; the variable resistance module includes one or more of a variable resistor and an adjusting transistor; and the shunting module includes a shunting resistor.

Compared with the prior art, in a light-emitting element driving circuit provided by the present application, an impedance adjusting branch receives voltages on both sides of a driving power supply stage, such that an impedance of the impedance-adjustable module can be adjusted according to the voltages, thereby improving a voltage drop at the driving power supply stage, balancing own power consumption and heat generation of the driving circuit, and enhancing the driving capacity of the circuit.

In an embodiment in which the impedance-adjustable module includes a shunting module and a variable resistance module, shunting states of the shunting module and the variable resistance module can also be adjusted according to the voltage drop at the driving power supply stage, and heating power of the driving circuit is shared by using the shunting module, so as to further improve the own power consumption and heat generation of the driving circuit.

DETAILED DESCRIPTION

Figure 1:
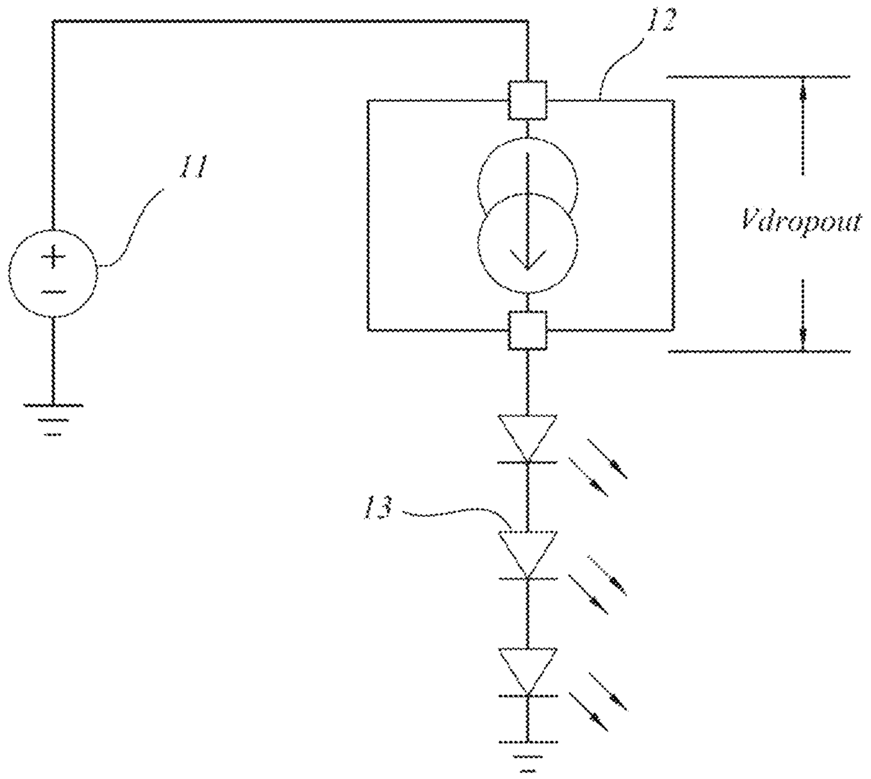
FIG. 1 is a schematic structural diagram of a light-emitting element driving circuit in the prior art.

The present application is described in detail below in conjunction with the specific embodiments shown in the accompanying drawings. However, these embodiments do not limit the present application, and the structural, methodical or functional transformations made by a person of ordinary skill in the art in accordance with these embodiments are included in the protection scope of the present application.

It needs to be noted that the terms “include”, “comprise” or any variation thereof are intended to cover a nonexclusive containing, such that a process, a method, an item or a device containing a series of elements not only includes these elements, but also includes other elements that are not set forth specifically, or also includes an inherent element of such a process, method, item or device. Moreover, the terms “first”, “second”, “third”, etc. are used for descriptive purposes only and are not to be construed as indicating or implying relative importance.

An embodiment of the present application provides an electric device, including a light-emitting element driving circuit. Preferably, the electric device may further include a light-emitting element. The light-emitting element driving circuit may be configured to perform high-side drive (see a first embodiment as below) or low-side drive (see a second embodiment as below) on the light-emitting element.

The light-emitting element may be configured as various model selections, and preferably may be a common light-emitting diode (LED) or a component derived from the LED, such as OLED. The light-emitting element may be applied to bulk electric devices such as automobiles, airplanes and trains. On the one hand, the electric device may be interpreted as a car, an airplane and a train, or as a part of the car, the airplane and the train. For example, the electric device may be interpreted as a car lamp lighting apparatus. On the other hand, the light-emitting element may refer to any component in the electric device that is driven to emit light. In other words, the light-emitting element in the electric device may be partially driven by the light-emitting element driving circuit and lighted, and other parts of the electric device are driven or controlled by other circuits. The light-emitting element may also be applied to other devices such as a display device, whereby the electric device may have a variety of different interpretations and schemes.

Specifically, the electric device may be a car headlamp, a car tail lamp, a car atmosphere lamp, a signal lamp, and other lighting devices or signal devices. In these devices, the light-emitting elements may present the structural characteristics of multiple channels, such as 12 channels, 24 channels or 36 channels. In this way, the light-emitting element driving circuit provided by the present application can adaptively realize the heat dissipation management of multiple channels, and also gives consideration to relatively high current driving capacity.

An embodiment of the present application provides a light-emitting element driving chip, including a light-emitting element driving circuit. The light-emitting element driving chip may be arranged in the electric device to achieve an equivalent effect as it contains the light-emitting element driving circuit.

The light-emitting element driving chip includes some additional features other than the light-emitting element driving circuit. In view of a relatively close correlation between the light-emitting element driving circuit and the additional features, the additional features will be given later. Of course, these additional features may also be understood as part of the light-emitting element driving circuit. In addition, a plurality of examples about the light-emitting element driving circuit given below may all be alternatively implemented in the above-mentioned light-emitting element driving chip or the above-mentioned electric device, thereby producing a plurality of derivative technical solutions contained in the present application.

Figure 2:
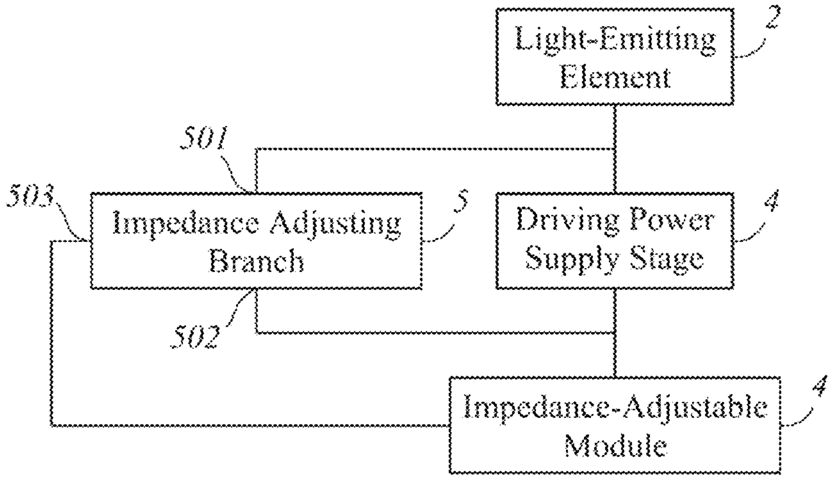
FIG. 2 is a schematic structural diagram of a light-emitting element driving circuit in an embodiment of the present application.

An embodiment of the present application provides a light-emitting element driving circuit as shown in FIG. 2, and may be independently implemented in addition to being arranged in any of the above-mentioned electric device or light-emitting element driving chip. The light-emitting element driving circuit includes a driving power supply stage 4, an impedance-adjustable module 3 and an impedance adjusting branch 5. The driving power supply stage 4 is arranged in a branch where the light-emitting element 2 is located; the impedance-adjustable module 3 is arranged in the branch where the light-emitting element 2 is located; and the impedance adjusting branch 5 is connected in parallel with the driving power supply stage 4. An adjustment output terminal 503 of the impedance adjusting branch 5 is coupled to the impedance-adjustable module 3.

The impedance adjusting branch 5 is configured to adjust an impedance of the impedance-adjustable module 3 according to voltages on both sides of the driving power supply stage 4.

In this way, the light-emitting element driving circuit may adjust the impedance of the impedance-adjustable module 3 in the light-emitting element driving circuit according to the voltages on both sides of the driving power supply stage 4, in particular a voltage drop of the driving power supply stage 4, thereby improving the voltage drop at the driving power supply stage 4, balancing the own power consumption and heat generation of the light-emitting element driving circuit, and enhancing the driving capacity of the circuit.

In one embodiment, the impedance adjusting branch 5 is configured to: in response to the voltage drop at the driving power supply stage 4 being greater than a predetermined compensation voltage value, adjust the impedance of the impedance-adjustable module 3 to increase.

In one embodiment, the impedance adjusting branch 5 is configured to: in response to the voltage drop at the driving power supply stage 4 being less than a predetermined compensation voltage value, adjust the impedance of the impedance-adjustable module 3 to decrease.

In this way, by changing the voltage drop at the impedance-adjustable module 3, the voltage drop at the driving power supply stage 4 is affected, so that the driving power supply stage 4 can be adjusted to operate in an optimal state, and thus a voltage drop between an input terminal and an output terminal of the driving power supply stage 4 is at least sufficient to drive the normal operation of the light-emitting element 2.

The above two embodiments may be combined to produce a preferred example, or one of them may be selected for configuration. The compensation voltage value may be dynamically adjusted according to a voltage margin required for power supply, and may also be predetermined in the impedance adjusting branch 5. For the latter embodiment, the compensation voltage value may characterize a voltage difference between a driving output terminal 402 and a driving input terminal 401 when the driving power supply stage 4 operates in an optimal state, or may also characterize a reasonable voltage difference between the driving output terminal 402 and the driving input terminal 401 that can be allowed by the normal operation of the driving power supply stage 4.

Figure 3:
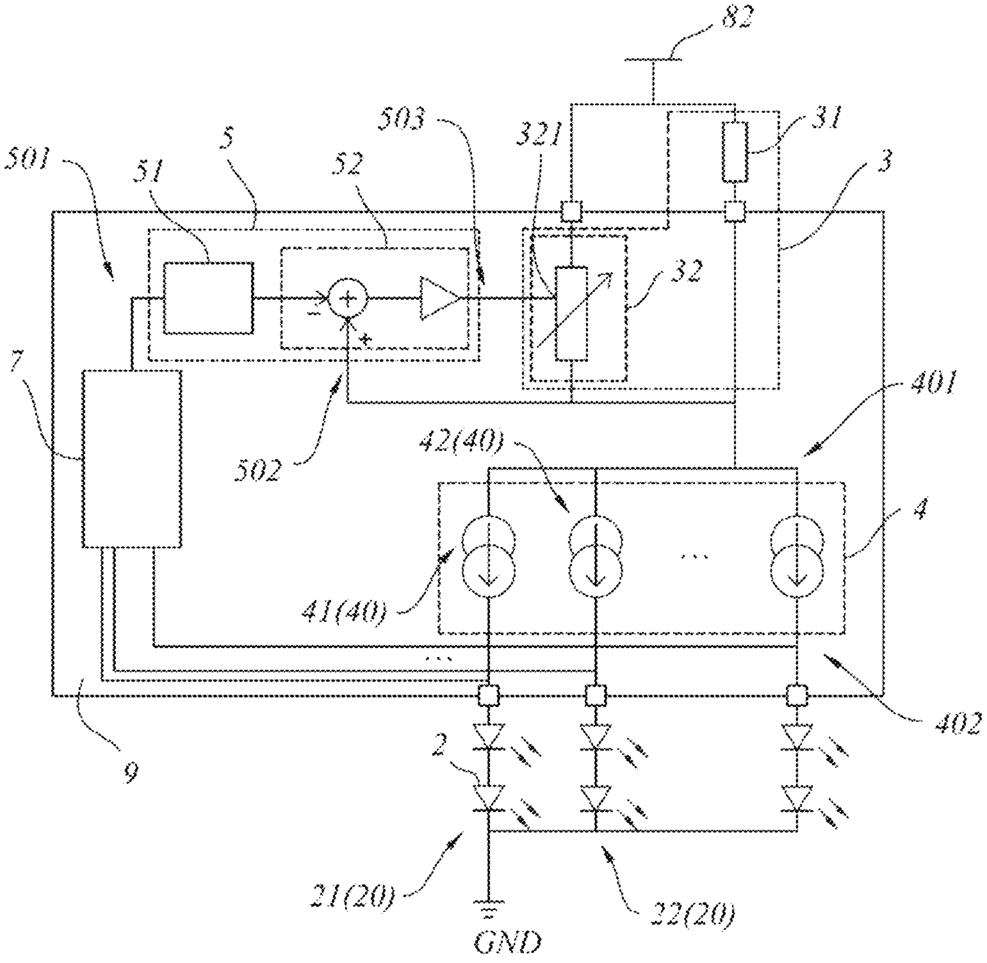
FIG. 3 is a circuit structure diagram of a first example of a light-emitting element driving circuit in a first embodiment of the present application.
Figure 4:
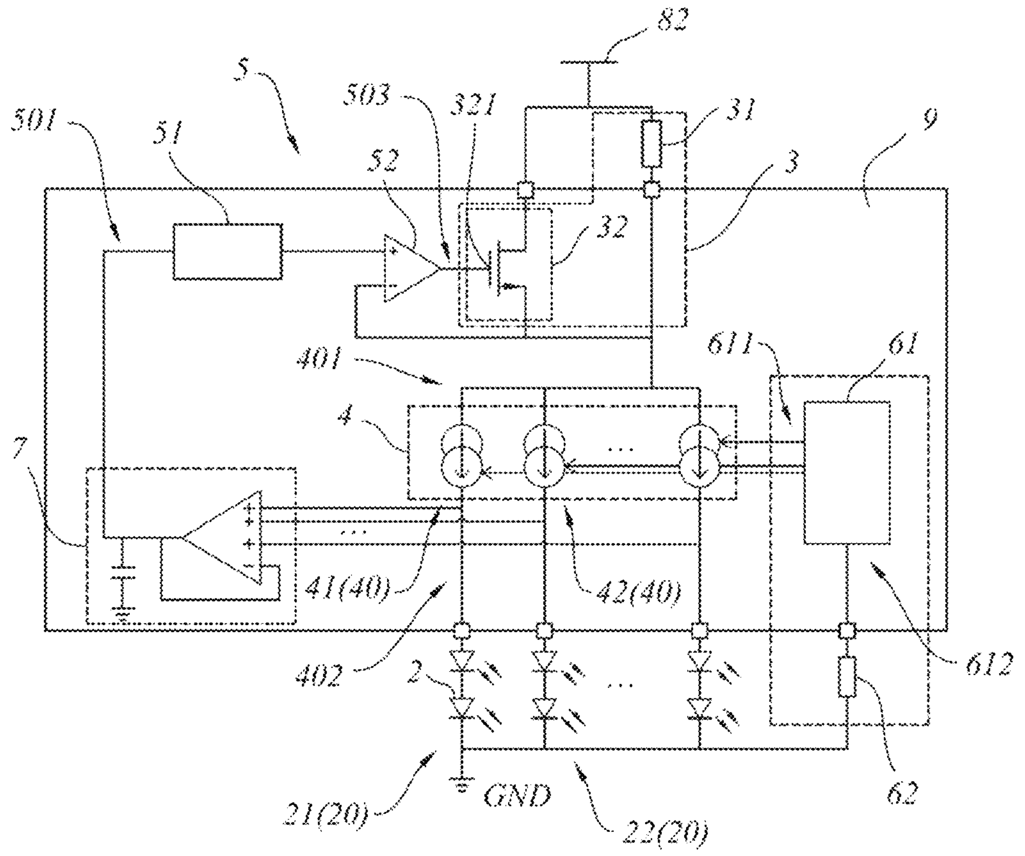
FIG. 4 is a circuit structure diagram of a second example of the light-emitting element driving circuit in the first embodiment of the present application.
Figure 5:
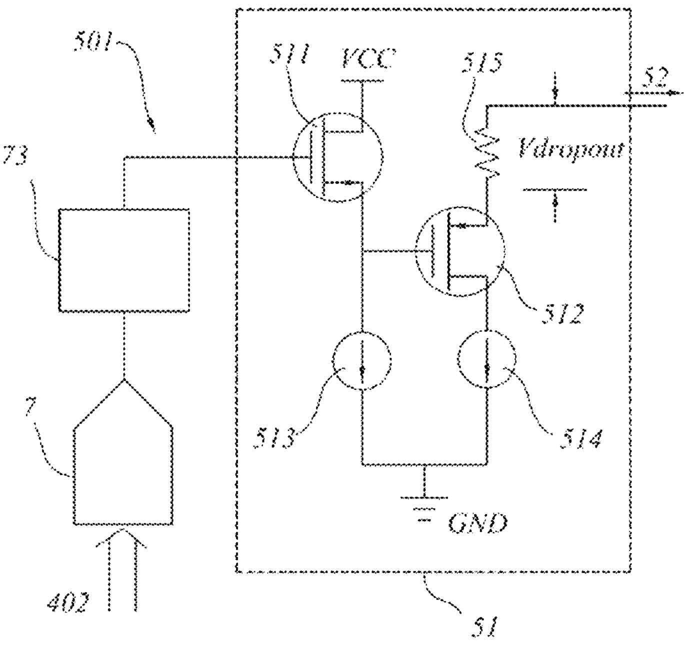
FIG. 5 is a circuit structure diagram of compensating circuit and sampling circuit portions of the light-emitting element driving circuit in the first embodiment of the present application.
Figure 7:
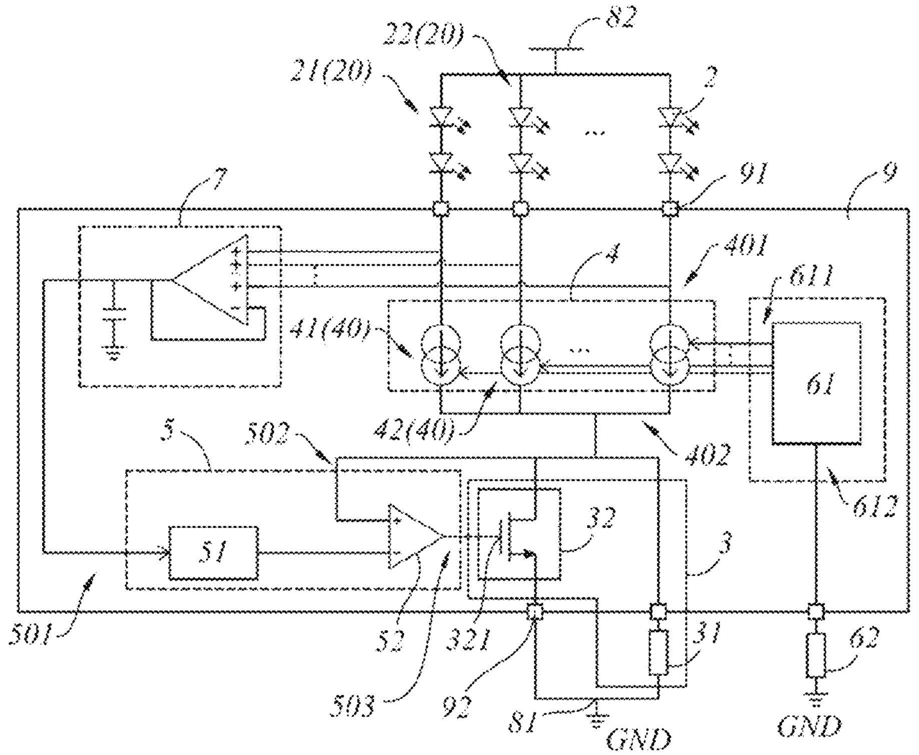
FIG. 7 is a circuit structure diagram of a light-emitting element driving circuit in a second embodiment of the present application.

In an embodiment in which the impedance-adjustable module 3 includes a shunting module 31 and a variable resistance module 32, as shown in FIG. 3, FIG. 4 or FIG. 7, the shunting module 31 is configured to share heating power, in particular, sharing heating power at least on the variable resistance module 32 which is generated by affected by the voltage margin of the driving power supply stage 4. The variable resistance module 32 is configured to cooperate with the shunting module 31 to jointly form an input current inputted into the driving power supply stage 4. The driving power supply stage 4 is configured to receive the current input, and stably drive the light-emitting element 2. The impedance adjusting branch 5 is configured to adjust an impedance of the variable resistance module 32, as well as a shunting situation on the variable resistance module 32 and the shunting module 31.

The voltage drop at the driving power supply stage 4 is a difference between a voltage value of the driving input terminal 401 of the driving power supply stage 4 and a voltage value of the driving output terminal 402 of the driving power supply stage 4. For example, if the voltage value of the driving output terminal 402 is defined as a first voltage value, and the voltage value of the driving input terminal 401 is defined as a second voltage value, the voltage drop at the driving power supply stage 4 may be a difference between the second voltage value and the first voltage value.

In one embodiment, the impedance adjusting branch 5 is configured to: in response to the voltage drop (specifically, the difference between the second voltage value and the first voltage value) at the driving power supply stage 4 being greater than a predetermined compensation voltage value, adjust the impedance of the impedance-adjustable module 3 to increase continuously until the difference between the voltage value of the driving input terminal 401 and the voltage value of the driving output terminal 402 approximates to the compensation voltage value.

In one embodiment, the impedance adjusting branch 5 is configured to: in response to the voltage drop at the driving power supply stage 4 being less than a predetermined compensation voltage value, adjust the impedance of the impedance-adjustable module 3 to decrease continuously until the difference between the voltage value of the driving input terminal 401 and the voltage value of the driving output terminal 402 approximates to the compensation voltage value.

The above two embodiments may be combined to produce a preferred example, or one of them may be selected for configuration.

In an embodiment in which the impedance-adjustable module 3 includes a shunting module 31 and a variable resistance module 32, as shown in FIG. 3, FIG. 4 or FIG. 7, based upon the above-mentioned adjustment of the impedance values, after the voltage of the driving input terminal 401 is higher than the voltage of the driving output terminal 402 and a difference therebetween is at least greater than an optimal value, the impedance value of the impedance-adjustable module 3 is adjusted, and a total impedance of the impedance-adjustable module 3 is increased to reduce the voltage at the driving input terminal 401. Specifically, the impedance value of the variable resistance module 32 is adjusted to reduce a current flowing through the variable resistance module 32 and increase a current shared on the shunting module 31, thereby reducing the heating power on the variable resistance module 32 and delivering partially the heating power to the shunting module 31 for sharing. In this way, the own power consumption and heat generation of the light-emitting element driving circuit are improved. In addition, because the adjustment process of the impedance value is performed continuously, the variable resistance module 32 and the shunting module 31 can dynamically follow an operating state of the driving power supply stage 4, and are thus allowed to operate dynamically and always in the optimal shunting state, and the driving power supply stage 4 operates in an optimal state at this time.

For the latter embodiment, the total impedance of the impedance-adjustable module 3 can be reduced in time, the shunting state can be adjusted, the current flowing through the variable resistance module 32 can be improved in time, and the voltage difference between two terminals of the driving power supply stage 4 can be adjusted to restore to an optimal operating state, thereby preventing an undervoltage or undercurrent state and maintaining the overall performance of the light-emitting element driving circuit.

Continued to FIG. 3, FIG. 4 or FIG. 7, the impedance-adjustable module 3 includes a shunting module 31 and a variable resistance module 32 that are connected in parallel with each other. In this way, a function of mutual shunting is achieved, and the distribution of the heating power between the shunting module 31 and the variable resistance module 32 is also taken into account, so the driving power supply stage 4 is driven to be in the optimal operating state. Preferably, the shunting module 31 may be used to share the heating power, in particular the heating power which is generated when a portion including the variable resistance module 32 in the driving circuit is affected by the voltage margin of the driving power supply stage 4. The variable resistance module 32 is configured to adjust a voltage on one side of the driving power supply stage 4 in cooperation with the shunting module 31.

Preferably, the variable resistance module 32 may include a variable resistor and/or an N-type transistor and/or a P-type transistor. When the N-type transistor is configured, the impedance adjusting branch 5 may adjust an impedance of the N-type transistor by controlling a gate voltage thereof. The variable resistance module 32 can be configured to control a current flowing through the variable resistance module 32 to be positively correlated with a level at the adjustment control terminal 321 of the variable resistance module 32. In other words, the variable resistance module 32 can be configured to control the impedance of the variable resistance module 32 to be negatively correlated with the level at the adjustment control terminal 321 of the variable resistance module 32. Preferably, the shunting module 31 may include a shunting resistor, or any other electronic component having a certain impedance and being able to share the heating power or current.

The adjustment output terminal 503 is coupled to the adjustment control terminal 321 of the variable resistance module 32. The impedance adjusting branch 5 is configured to adjust the impedance of the variable resistance module 32 according to the voltages on both sides of the driving power supply stage 4. In this way, the action of the adjustment control terminal 321 or an electrical signal outputted to the adjustment control terminal 321 can be adjusted by collecting and according to electrical signal situations of the driving output terminal 402 and the driving input terminal 401 respectively, so as to influence the state of the impedance-adjustable module 3, as well as the shunting situation of the variable resistance module 32 and the shunting module 31. Specifically, the impedance adjusting branch 5 may be configured to adjust an impedance value of the variable resistance module 32 according to the first voltage value and the second voltage value.

When the impedance adjusting branch 5 has an input terminal coupled between the light-emitting element 2 and the driving power supply stage 4, a driving voltage (in other words, a port to the light-emitting element 2) required for the light-emitting element 2 to light up can be sampled by the impedance adjusting branch 5, and accordingly the impedance situation presented by the impedance-adjustable module 3 in the light-emitting element driving circuit can be adjusted, so that the driving power supply stage 4 operates in a state of minimum voltage drop, thereby improving the power consumption and heat generation increase caused by the voltage margin, then improving the driving capacity of the circuit, and thus adapting to a driving need for a multi-channel light-emitting element.

In one embodiment, the impedance adjusting branch 5 is configured to: in response to the voltage drop at the driving power supply stage 4 being greater than a predetermined compensation voltage value, adjust the impedance of the variable resistance module 32 to increase. Preferably, it may be a continuous increase.

In one embodiment, the impedance adjusting branch 5 is configured to: in response to the voltage drop at the driving power supply stage 4 being less than a predetermined compensation voltage value, adjust the impedance of the variable resistance module 32 to decrease. Preferably, it may be a continuous decrease.

The above two embodiments may be combined to produce a preferred example, or one of them may be selected for configuration.

In the light-emitting element driving chip provided by the present application, the impedance-adjustable module 3 includes a shunting module 31 and a variable resistance module 32. The light-emitting element driving chip further includes a substrate 9. The variable resistance module 32, the driving power supply stage 4 and the impedance adjusting branch 5 may be provided on the substrate 9 for encapsulation; and a sampling circuit 7 provided later may also be provided on the substrate 9. The shunting module 31 may be provided outside the substrate 9.

In this way, the impedance-adjustable module 3 is at least partially provided outside the chip, and the corresponding heat dissipation will also be at least partially carried out outside the chip, which can further prevent the heat dissipation from affecting the operation of the driving power supply stage 4 as well as other parts of the chip, utilize the shunting module 31 to share the current and generate the heating power, and meanwhile ensure the high-performance operation of the driving power supply stage 4.

In the light-emitting element driving circuit provided by the present application, the aforesaid shunting module 31 and variable resistance module 32 may likewise be included and configured to achieve corresponding functions and uses. Even in the embodiment in which the shunting module 31 is not provided outside the chip, the performance of the circuit can be improved due to the sharing of heating power.

In addition, the present application does not limit the number of the shunting module 31 and the number of the variable resistance module 32 in either the light-emitting element driving chip or the light-emitting element driving circuit, which may be provided as one or more in number. For the specific model selection, the variable resistance module 32 may include one or more of a variable resistor and an adjusting transistor, and may be provided with one or more of them in parallel or in series, so as to be able to share the current and the heating power together with the shunting module 31 and to receive a finer adjustment requirement. The shunting module 31 preferably includes a shunting resistor, but the present application does not exclude the use of other electronic components having certain impedance and capable of sharing the heating power and current to replace the shunting resistor.

Figure 11:
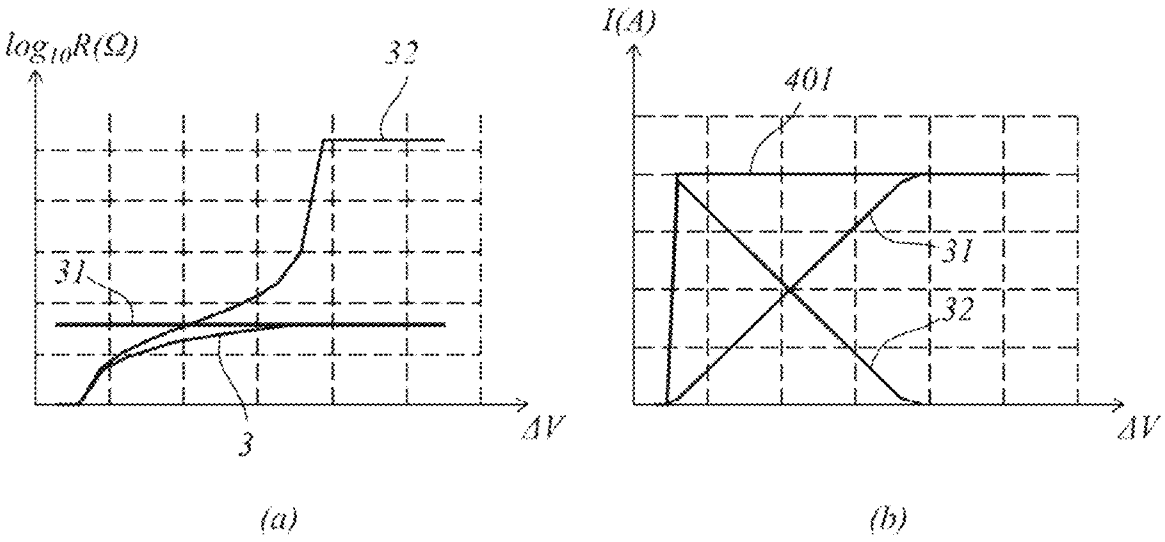
FIG. 11 is a schematic diagram of a resistance logarithmic value that changes with a voltage margin of a power supply and a current value on the branch that changes with the voltage margin of the power supply when the light-emitting element driving circuit operates in an embodiment of the present application.
Figure 12:
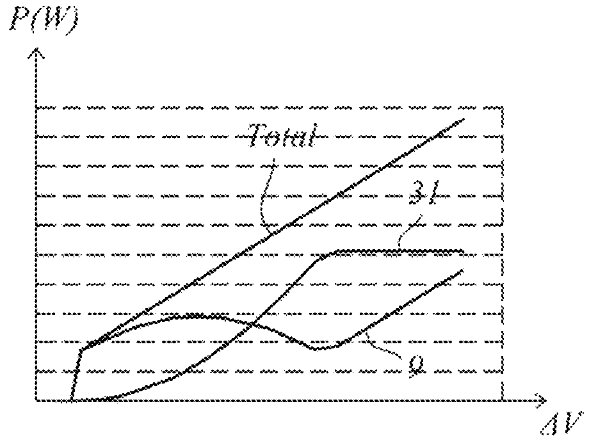
FIG. 12 is a schematic diagram of a power value that changes with the voltage margin of the power supply when the light-emitting element driving circuit operates in an embodiment of the present application.

FIG. 11 schematically provides a schematic diagram of variations of the circuit parameters changing with the power supply voltage margin ΔV as formed by the simulation in the embodiment of the light-emitting element driving circuit provided by any of the aforesaid technical solutions. FIG. 11(*a*) illustrates the variation trend of logarithms log 1. R of the resistances of the impedance-adjustable module 3, the shunting module 31 and the variable resistance module 32 changing with the voltage margin ΔV when the light-emitting element driving circuit is operating. FIG. 11(*b*) illustrates the variation trend of the current I on the shunting module 31, the variable resistance module 32, and the driving input terminal 401 of the driving power supply stage changing with the voltage margin ΔV when the light-emitting element drive circuit is operating. When there is a plurality of driving input terminals 401, the current I is a sum of currents of the plurality of input terminals. FIG. 12 illustrates the variation of the power P of the overall system Total, the shunting module 31 provided outside the substrate 9 and the substrate 9, which changes with the voltage margin ΔV when the light-emitting element driving circuit is operating.

When the voltage margin ΔV of the power supply is increased, the output level of the adjustment control terminal 503 is decreased, the resistance value of the variable resistance module 32 is increased, and the current and power shared on the shunting module 31 are increased accordingly, such that the current shared on the variable resistance module 32 is decreased, and heat dissipation is carried out more on the shunting module 31, thereby preventing influence on the driving power supply stage 4. When the voltage margin ΔV of the power supply is decreased, the output level of the adjustment control terminal 503 is increased, the resistance value of the variable resistance module 32 is decreased, and the current and power shared on the shunting module 31 are decreased accordingly, thereby maintaining the performance and even heat dissipation. Preferably, the adjustment of the impedance value of the variable resistance module 32 by the impedance adjusting branch 5 is continuous.

Those skilled in the art have the ability to read other variation trends from FIGS. 11 and 12 as technical effects of the present application and to summarize the laws therein to form a derived technical solution.

A variety of embodiments can be configured for the aforesaid adjustment process. For example, in one embodiment, it is possible to perform an addition operation (positive compensation) on the first voltage value and the compensation voltage value before comparing them with the second voltage value; or it is possible to perform a subtraction operation (negative compensation) on the second voltage value and the compensation voltage value before comparing them with the first voltage value; or it is also possible to perform a subtraction operation on the second voltage value and the first voltage value before comparing the resulted difference with the compensation voltage value. Based on any of the above, an operational circuit including an operational amplifier, an error amplifier, a digital comparator and the like can be formed. Thus, it can be understood that the various adjustment methods described above and the corresponding circuit structures are within the protection scope of the present application.

Further as shown in FIG. 3, FIG. 4, or FIG. 7, in this embodiment, the impedance adjusting branch 5 may include a compensation circuit 51 and an error amplification circuit 52. The compensation circuit 51 herein stores the compensation voltage value, and performs positive compensation for the first voltage value or negative compensation for the second voltage value. The error amplification circuit 52 herein is configured to compare the compensated voltage value with another voltage value, so as to adjust the action or state of the adjustment control terminal 321 of the variable resistance module 32 according to the comparison result.

When the impedance-adjustable module 3 includes the variable resistance module 32 that is configured as a transistor, the adjustment control terminal 321 may be a gate of the transistor. In other embodiments, the variable resistance module 32 may also be interpreted as a part of the impedance adjusting branch 5.

The storage solution of the compensation circuit 51 for the compensation voltage value may include storing the compensation voltage value in a component such as a capacitor, thereby acting directly on the first voltage value or the second voltage value to generate a voltage input to the error amplification circuit 52, or include configuring a fixed value resistor to pull the first voltage value up or the second voltage value down, or include steps such as analogue-to-digital conversion, digital operation and digital-to-analogue conversion to complete the above operation.

The output terminal of the error amplification circuit 52 is coupled to the impedance-adjustable module 3. In an embodiment in which the impedance-adjustable module 3 includes the variable resistance module 32, the output terminal of the error amplification circuit 52 is coupled to the adjustment control terminal 321.

The first input terminal of the error amplification circuit 52 is coupled between the driving power supply stage 4 and the light-emitting element 2 via the compensation circuit 51. The compensation circuit 51 herein is configured to compensate the compensation voltage of the driving power supply stage 4. Specifically, the compensation circuit 51 is configured to compensate either of the first voltage value and the second voltage value according to a compensation voltage value Vdropout, thereby outputting the compensated voltage to the error amplification circuit 52.

The second input terminal of the error amplification circuit 52 is coupled to the other terminal of the driving power supply stage 4 that is not coupled to the light-emitting element 2. Specifically, in FIGS. 3 and 4, the driving output terminal 402 of the driving power supply stage 4 is coupled to the light-emitting element 2. Thus, the second input terminal of the error amplification circuit 52 is coupled to the driving input terminal 401 of the driving power supply stage 4. In FIG. 7, the driving input terminal 401 of the driving power supply stage 4 is coupled to the light-emitting element 2. Thus, the second input terminal of the error amplification circuit 52 is coupled to the driving output terminal 402 of the driving power supply stage 4.

The light-emitting element driving circuit further includes a sampling circuit 7. The error amplification circuit 52 is coupled to a node between the driving power supply stage 4 and the light-emitting element 2 via the compensation circuit 51 and the sampling circuit 7. Further, a number of nodes may be formed in a connection relationship between a branch formed by the error amplification circuit 52, the compensation circuit 51 and the sampling circuit 7 and a branch formed by the driving power supply stage 4 and the light-emitting element 2.

The sampling circuit 7 is configured to collect an extremum voltage value at the node between the driving power supply stage 4 and the light-emitting element 2. The extremum voltage value includes at least one of a maximum voltage value and a minimum voltage value. The compensation circuit 51 is configured to compensate the extremum voltage value according to the compensation voltage.

Figure 6:
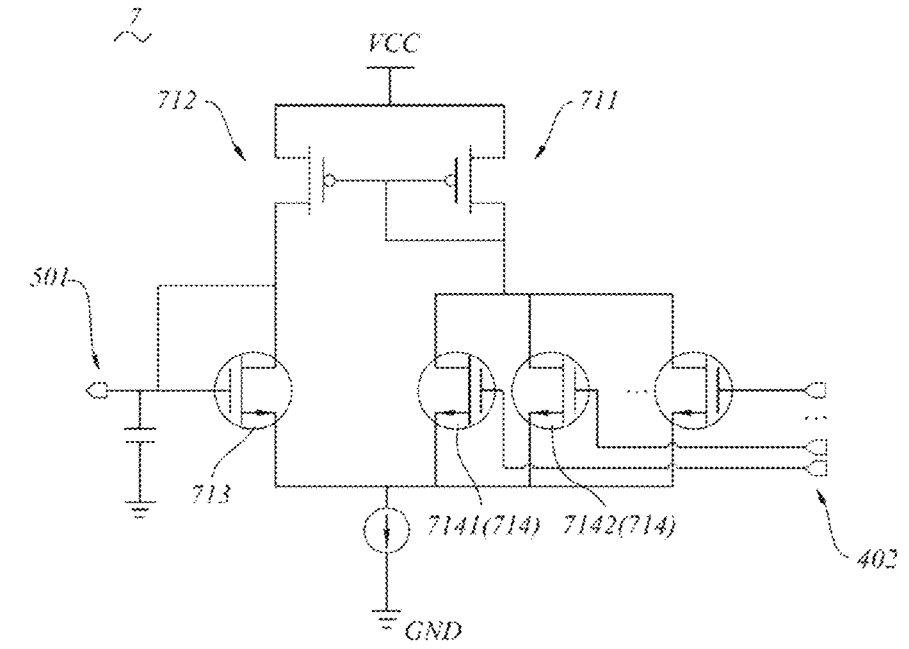
FIG. 6 is a circuit structure diagram of a first example of a sampling circuit of the light-emitting element driving circuit in the first embodiment of the present application.
Figure 8:
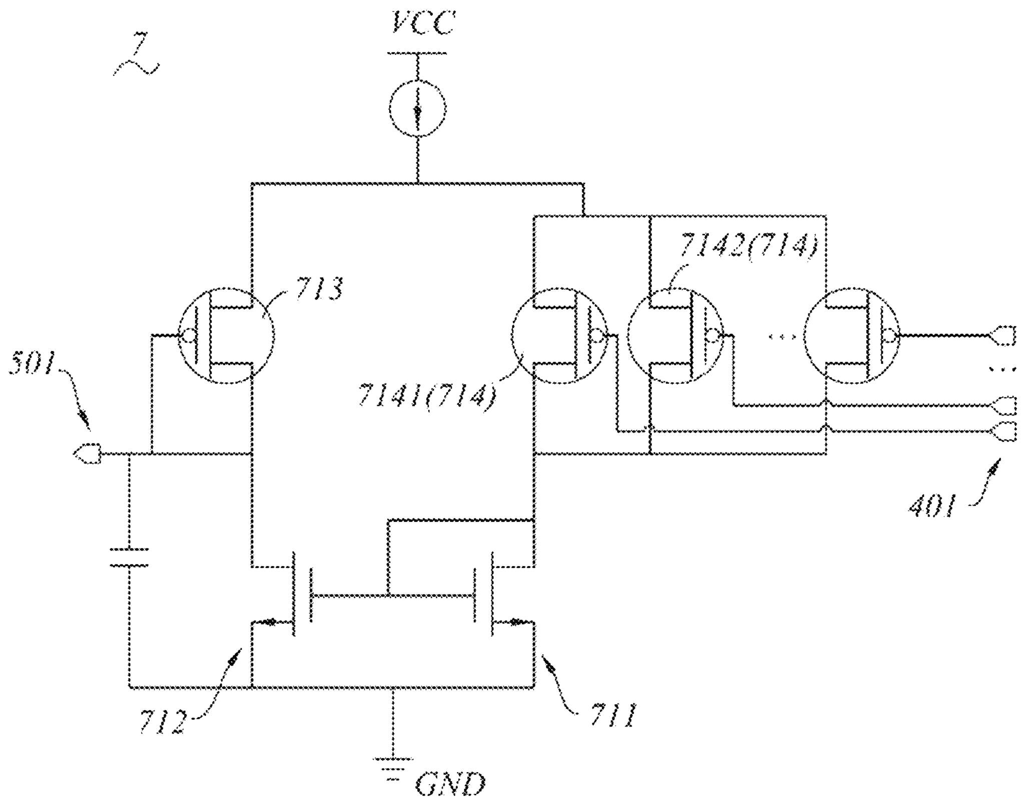
FIG. 8 is a circuit structure diagram of a first example of a sampling circuit of a light-emitting element driving circuit in a second embodiment of the present application.

In a first embodiment of the sampling circuit 7 provided in FIG. 6 or FIG. 8, the sampling circuit 7 may include an output transistor 713, a plurality of input transistors 714, a first mirror branch 711 and a second mirror branch 712.

The output transistor 713 may be connected to the second mirror branch 712. Specifically, the input transistor 714 may include a first input transistor 7141 and a second input transistor 7142. The first input transistor 7141 and the second input transistor 7142 herein are connected in parallel with each other. In addition, the first input transistor 7141 is connected to the first mirror branch 711, and the second input transistor 7142 is connected to the first mirror branch 711. In this way, the transistors can be utilized to complete the process of selecting and mirroring the voltage from the driving power supply stage 4 to the impedance adjusting branch 5.

The control terminal of the first input transistor 7141 may be connected to a first driving branch 41 in the driving power supply stage 4 and specifically may be connected to the input terminal thereof, and the control terminal of the second input transistor 7142 may be connected to a second driving branch 42 in the driving power supply stage 4 and specifically may be connected to the input terminal thereof. In this way, sampling of the extremum voltage values can be achieved.

Further as shown in FIG. 3, FIG. 4, or FIG. 7, in one application scenario, the light-emitting elements 2 are provided in at least two groups at the rear end of the driving power supply stage 4, such that the driving power supply stage 4 may correspondingly include at least two groups of driving branches 40. In addition, the at least two groups of driving branches 40 are each correspondingly connected with the at least two groups of light-emitting elements 2, and the light-emitting channels formed by the driving branches 40 and the corresponding light-emitting elements 2 (or the light-emitting branches 20) are disposed in parallel with each other on one side of the driving power supply stage 4. In this way, the driving of light-emitting elements in multiple light-emitting channels can be adapted.

A plurality of light-emitting elements 2 (specifically LEDs) may be provided in series on a single light-emitting branch 20, and there may be a plurality of light-emitting branches 20 provided on one side of the driving power supply stage 4. For example, the driving power supply stage 4 includes at least the first driving branch 41 and the second driving branch 42; and the light-emitting branch 20 includes at least a first light-emitting branch 21 and a second light-emitting branch 22 that are connected in parallel with each other. The first driving branch 41 and the second driving branch 42 herein are configured to drive the light-emitting branches 20 correspondingly. A current source and/or a voltage source may be included on each driving branch 40.

The first light-emitting branch 21 is coupled to the first driving branch 41 to form a first channel; the second light-emitting branch 22 is coupled to the second driving branch 42 to form a second channel; and the first channel and the second channel are coupled in parallel with each other to realize the corresponding light-emitting function. The present application does not exclude various timing adjustments for the illumination of the light-emitting element 2, and improvements and technical effects resulting therefrom may be included in the present application. The present application does not limit the number of the channels, but may include a third channel, a fourth channel, etc., or only include the first channel. In the case of including a plurality of the channels, there may be a plurality of driving input terminals 401, and the aforesaid connection to the driving input terminal 401 may be a connection to one or more of the driving input terminals 401. The driving output terminal 402 may be interpreted similarly. The process of acquisition of the sampling voltage may be the result of acquiring and comparing the voltages on all the channels.

In order to adapt to the needs of different light-emitting branches 20, the light-emitting element driving circuit may further include a current control circuit 61 and a configuration resistor 62 which are connected in parallel with the sampling circuit 7 and configured for controlling the driving current of each of the light-emitting channels, respectively, as well as for regulating a global range of the driving current.

Specifically, the control output terminal 611 of the current control circuit 61 is connected to the driving branches 40, respectively. In an embodiment in which there are multiple groups of the driving branches 40, on the one hand, in an example where each group includes at least one current source respectively, the control output terminal 611 may be specifically connected at a current source or a voltage source in the driving branch 40; on the other hand, the control output terminal 611 may be specifically connected at the first driving branch 41 and the second driving branch 42.

Based on this, there may be a plurality of the control output terminals 611 correspondingly, each of which is connected to the current source correspondingly to provide a current-limiting control signal; and the configuration input terminal 612 of the current control circuit 6 is grounded via the configuration resistor 62. Thus, it is possible to adapt to the needs of different light-emitting branches 20, and a global control over the current on the channel can be achieved by replacing or adjusting the resistance value of the configuration resistor 62, in conjunction with the current control circuit 61.

The control output terminal 611 herein may be provided corresponding to the channel, the driving branch or a current source in the driving branch, and any two of them may have an equal number. Preferably, the number of light-emitting branches 20, driving branches 40 and control output terminals 611 may be configured to be equal.

A first embodiment and a second embodiment of the present application will be provided further below.

In the first embodiment provided by the present application, as shown in FIGS. 3 to 6, the light-emitting element 2 is coupled to the driving output terminal 402 of the driving power supply stage 4. The sampling circuit 7 is configured to collect a sampling voltage with the maximum voltage value at the driving input terminal 401. The compensation circuit 51 is configured to positively compensate the sampling voltage according to the compensation voltage Vdropout.

In the first embodiment provided by the present application, the impedance-adjustable module 3 is connected between the power supply terminal 82 and the driving input terminal 401 of the driving power supply stage 4. The light-emitting element 2 is connected between the driving output terminal 402 of the driving power supply stage 4 and the ground GND. The compensation circuit 51 includes a first N-type transistor 511, a first P-type transistor 512, and a compensation resistor 515.

In the first embodiment, the gate of the first N-type transistor 511 is coupled to the sampling circuit 7, the drain of the first N-type transistor 511 is coupled to the power supply level VCC (which may specifically be coupled to the power supply terminal 82), and the source of the first N-type transistor 511 is coupled to the gate of the first P-type transistor 512. The drain of the first P-type transistor 512 is grounded to GND, and the source of the first P-type transistor 512 is coupled to the error amplification circuit 52 via the compensation resistor 515.

In the first embodiment, one terminal of the shunting module 31 is connected to the power supply terminal 82, and the other terminal of the shunting module 31 is connected to the driving input terminal 401 of the driving power supply stage 4; and one terminal of the variable resistance module 32 is connected to the power supply terminal 82, and the other terminal of the variable resistance module 32 is connected to the driving input terminal 401 of the driving power supply stage 4. The shunting module 31 and the variable resistance module 32 are connected in parallel with each other. The driving output terminal 402 of the driving power supply stage 4 is connected to the light-emitting element 2. Thus, the input current jointly generated after shunting is further output to the side of the light-emitting element 2 after adjustment, so as to achieve the effect of driving the light-emitting element 2.

Further, the impedance adjusting branch 5 includes a sampling input terminal 501, a reference input terminal 502, and an adjustment output terminal 503. The sampling input terminal 501 herein is connected to the driving output terminal 402, and the reference input terminal 502 is connected to the driving input terminal 401.

The above "input terminal" and "output terminal" may also be defined as "input side" and "output side". This definition is not intended to limit the specific form and structure of the device, but rather to take into account the fact that there may be a number of ports located side by side at the location of the above structure, and that the above connection relationship can be applied interchangeably. For example, in one embodiment, there may be a plurality of variable resistance modules 32 provided in series or parallel with each other between the power supply terminal 82 and the driving power supply stage 4. The adjustment output side may correspondingly include a plurality of adjustment output terminals 503, and the plurality of adjustment output terminals 503 may be connected to a plurality of adjustment control terminals 321 of the plurality of variable resistance modules 32, respectively, so as to realize separate control of the plurality of variable resistance modules 32. In the case where the driving power supply stage 4 includes a plurality of groups of driving branches corresponding to light emitting elements 2 configured to be multi-channel, other structural configurations or connection configurations as may be foreseen by those skilled in the art may likewise be formed at the driving input side and the driving output side.

In the first embodiment, the first input terminal of the error amplification circuit 52 is directly taken as or connected to the sampling input terminal 501 and thus to the driving output terminal 402, and the second input terminal of the error amplification circuit 52 is directly taken as or connected to the reference input terminal 502 and thus to the driving input terminal 401.

Specifically, when the compensation circuit 51 is provided between the first input terminal of the error amplification circuit 52 and the driving output terminal 402, a side of the compensation circuit 51 connected to the driving output terminal 402 may serve as the sampling input terminal 501. After collecting the first voltage value, the compensation circuit 51 performs an addition operation (positive compensation) on the first voltage value according to the compensation voltage value, and generates and outputs the third voltage value to the error amplification circuit 52 for comparison. When the compensation circuit 51 is provided between the second input terminal of the error amplification circuit 52 and the driving input terminal 401, a side of the compensation circuit 51 connected to the driving input terminal 401 may serve as the reference input terminal 502. After collecting the second voltage value, the compensation circuit 51 performs a subtraction operation (negative compensation) on the second voltage value according to the compensation voltage value, and generates and outputs the third voltage value to the error amplification circuit 52 for comparison.

For the cooperating structure of the error amplification circuit 52 and the variable resistance module 32, in the example provided in FIG. 3, the inverting input terminal of the error amplification circuit 52 serves as the first input terminal, and is connected to the driving output terminal 402 via the compensation circuit 51; and the positive input terminal of the error amplification circuit 52 serves as the second input terminal and is connected directly to the driving input terminal 401 as the reference input terminal 502. In this way, when the second voltage value is greater than the sum of the first voltage value and the compensation voltage value, the error amplification circuit 52 amplifies the comparison result and outputs a control signal with increasing level to the adjustment control terminal 321, thereby controlling the impedance value of the variable resistor module 32 to increase continuously; and/or, when the sum of the first voltage value and the compensation voltage value is greater than the second voltage value, the error amplification circuit 52 amplifies the comparison result and outputs a control signal with decreasing level to the adjustment control terminal 321, thereby controlling the impedance value of the variable resistor module 32 to decrease continuously.

Preferably, the variable resistance module 32 includes a variable resistor and/or a P-transistor. The adjustment control end 321, upon receiving the control signal with increasing level, controls to increase the resistance value of the variable resistor and/or the P-type transistor; and/or the adjustment control end 321, upon receiving the control signal with decreasing level, controls to decrease the resistance value of the variable resistor and/or the P-type transistor.

In the example provided in FIG. 4, the positive input terminal of the error amplification circuit 52 serves as the first input terminal, and is connected to the driving output terminal 402 via the compensation circuit 51, and the inverting input terminal of the error amplification circuit 52 serves as the second input terminal and is connected directly to the driving input terminal 401 as the reference input terminal 502. In this way, when the second voltage value is greater than the sum of the first voltage value and the compensation voltage value, the error amplification circuit 52 amplifies the comparison result and outputs a control signal with decreasing level to the adjustment control terminal 321, thereby controlling the impedance value of the variable resistor module 32 to increase continuously; and/or, when the sum of the first voltage value and the compensation voltage value is greater than the second voltage value, the error amplification circuit 52 amplifies the comparison result and outputs a control signal with increasing level to the adjustment control terminal 321, thereby controlling the impedance value of the variable resistor module 32 decrease continuously. Preferably, the variable resistance module 32 includes an N-type transistor, and the adjustment control terminal 321, upon receiving the control signal with decreasing level, controls to increase the resistance value of the internal on-resistance of the N-type transistor; and/or the adjustment control terminal 321, upon receiving the control signal with increasing level, controls to decrease the resistance value of the internal on-resistance of N-type transistor.

In the first embodiment, the compensation circuit 51 may include a first N-type transistor 511, a first P-type transistor 512, a first current source 513, a second current source 514, and a compensation resistor 515. The first N-type transistor 511 and the first P-type transistor 512 herein may be field effect transistors for holding and transmitting the first voltage value from the sampling input terminal 501 and applying the same to the compensation resistor 515. The first current source 513 and the second current source 514 are configured to generate bias currents corresponding to the first N-type transistor 511 and the first P-type transistor 512, respectively; and the compensation resistor 515 is configured to generate a compensation voltage Vdropout having the compensation voltage value at both terminals, to pull up a voltage corresponding to the first voltage value formed at one terminal of the compensation resistor 515 and output it to the error amplification circuit 52.

Further, the gate of the first N-type transistor 511 is connected to the driving output terminal 402 as the sampling input terminal 501, the drain of the first N-type transistor 511 is connected to an internal level (which may be the power supply level VCC or the power supply terminal 82), and the source of the first N-type transistor 511 is connected to the gate of the first P-type transistor 512 and the ground GND, respectively. The drain of the first P-type transistor 512 is connected to the ground GND, and the source of the first P-type transistor 512 is connected to the error amplification circuit 52.

Preferably, the first current source 513 is connected between the source of the first N-type transistor 511 and the ground GND, and the second current source 512 is connected between the drain of the first P-type transistor 512 and the ground GND, thereby providing the first N-type transistor 511 and the first P-type transistor 512 with the same or different bias currents, respectively. In addition, the compensation resistor 515 is connected between the source of the first P-type transistor 512 and the error amplification circuit 52, thereby forming the compensation voltage Vdropout.

It should be noted that the configuration of the transistor is only one of the preferred embodiments of the compensation circuit 51, and by replacing the above transistor with a switching transistor such as a triode, for example, or other electronic components, it is also possible to achieve the desired technical effect to a certain extent.

A plurality of driving terminals corresponding to the driving branches 40 may be included at the driving output terminal 402, and the light-emitting element 2 may be driven by a driving current by connecting and cooperating with the driving terminals.

A first control output terminal in the control output terminal 611 is connected to at least one current source on the first driving branch 41; the first driving branch 41 is connected to the first light-emitting branch 21 via a first driving output terminal in the driving output terminal 402; the first light-emitting branch 21 has a plurality of light-emitting elements 2 connected in series; and the negative electrode of the light-emitting element 2 distal from the driving output terminal 402 is connected to ground GND. The second driving branch 42 and the second light-emitting branch 22 have structural configurations similar to those described above and will not be repeated herein.

With the formation of a plurality of channels as described above, the maximum voltage value on the plurality of channels can be taken as the first voltage value, thereby improving the control and distribution of voltage and heating power by the light-emitting element driving circuit. Based on this, the light-emitting element driving circuit may include the aforesaid sampling circuit 7; and specifically, the sampling circuit 7 is provided between the impedance adjusting branch 6 and the driving output terminal 402, and is configured to acquire the maximum of the sampling voltages on the driving output terminal 402 as the first voltage value.

On the one hand, the sampling circuit 7 may likewise be applied in the above example that specifically defines the structure of the compensation circuit 51. In this example, the compensation circuit 51 is provided between the sampling circuit 7 and the error amplification circuit 52; and specifically, it may be provided between the driving output terminal 402 and the first input terminal of the error amplification circuit 52, and the sampling circuit 7 is provided between the compensation circuit 51 and the driving output terminal 402, so that the selected first voltage value is fed into the compensation circuit 51 via the sampling input terminal 501.

Further, the gate of the first N-type transistor 511 may be connected to the output terminal of the sampling circuit 7 to acquire the selected first voltage value. The aforesaid connection is also not limited to a direct connection, and when the sampling circuit 7 does not include a voltage holding structure, a holding circuit 73 may be provided between the sampling circuit 7 and the compensation circuit 51. The holding circuit 73 may include a follower switch connected between the output terminal of the sampling circuit 7 and the sampling input terminal 501, and a holding capacitor connected at one terminal between the above two parts and grounded at the other terminal. The structural configurations of the holding circuit that can be foreseen by those skilled in the art and that serve a similar function are all within the protection scope of the present application.

Figure 10:
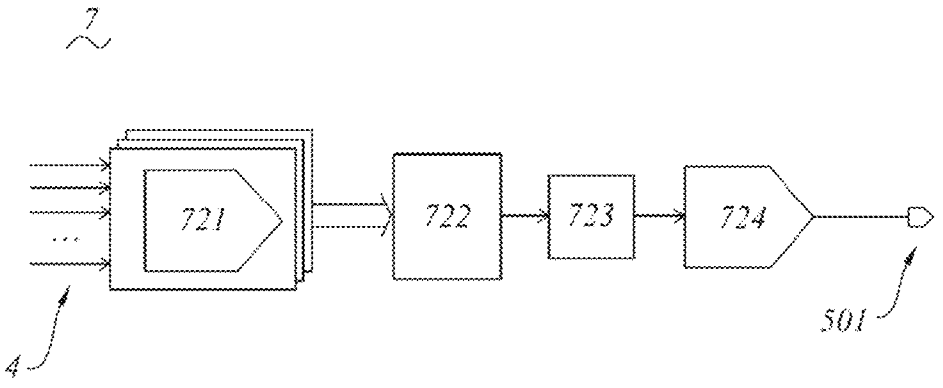
FIG. 10 is a circuit structure diagram of a second example of the sampling circuit of the light-emitting element driving circuit in an embodiment of the present application.

On the other hand, for the specific structure of the sampling circuit 7, in the second example thereof, it may have a structural configuration as shown in FIG. 10. In this embodiment, the sampling circuit 7 includes an analogue-to-digital converter 721, a digital comparator 722, a register 723, and a digital-to-analogue converter 724 sequentially connected in series. The input terminal of the analogue-to-digital converter 721 is connected to a driving output terminal 402 of the driving power supply stage 4, and the output terminal of the digital-to-analogue converter 724 is connected to the sampling input terminal 501. The analogue-to-digital converter 721 is configured to receive voltage values of the plurality of channels and convert them into digital quantities. The digital comparator 722 is configured to compare the multiple digital voltage quantities of the plurality of channels on the driving output terminal 402 and select them to get a maximum digital voltage value. The register 723 is configured to store the maximum digital voltage value. The digital-to-analogue converter 724 is configured to convert the maximum digital voltage value into an analogue quantity to acquire a voltage having a first voltage value, and output the voltage.

The control terminals of the at least two input transistors 714 are connected to the driving output terminals 402 of the at least two groups of driving branches 40, respectively, and the at least two input transistors 714 are connected in parallel with each other and are connected between the first mirror branch 711 and the reference grounding terminal GND. The output transistor 713 is connected between the second mirror branch 712 and the reference grounding terminal GND, and the control terminal of the output transistor 713 is connected to the input terminal of the output transistor 713 and the sampling input terminal 501, respectively. Preferably, the sampling circuit 7 may further include a voltage stabilized capacitor, an terminal of which is connected to the control terminal of the output transistor 713 and the other terminal of which is grounded.

Specifically, the input transistor 714 includes a first input transistor 7141 and a second input transistor 7142. The control terminal of the first input transistor 7141 is connected to the first driving output terminal, and the control terminal of the second input transistor 7142 is connected to the second driving output terminal corresponding to the second driving branch 42, so as to receive the voltage values of the two channels at the driving output terminal 402. In the case that the voltage value at the first driving output terminal is greater than the voltage value at the second driving output terminal, the input transistor 714 gates on the first input transistor 7141 and turns off the second input transistor 7142, such that the first mirror branch 711 mirrors the voltage at the control terminal of the first input transistor 7141 to the control terminal of the output transistor 713, thereby generating a voltage having the first voltage value and outputting the voltage. In this way, the step of selecting the voltage value can be efficiently completed.

In one embodiment, the input transistor 714 and the output transistor 713 are configured as the same model selection, and are preferably N-type field effect transistors. The first mirror branch 711 and the second mirror branch 712 include a first mirror transistor and a second mirror transistor, respectively, and the first mirror transistor and the second mirror transistor are configured as the same model selection, and are preferably P-type field effect transistors. Based on this, the control terminal described hereinbefore may be specifically defined as the gate of the N-type field effect transistor or the gate of the P-type field effect transistor; the input terminal described hereinbefore may be specifically defined as the drain of the N-type field effect transistor or the source of the P-type field effect transistor; and the output terminal described hereinbefore may be specifically defined as the source of the N-type field effect transistor or the drain of the P-type field effect transistor.

In summary, according to the first embodiment provided by the present application, voltage values from the driving output terminal and the driving input terminal are received through an impedance adjusting branch, respectively; and the impedance of an adjustment unit connected in parallel with the shunting unit and provided before the driving input terminal is adjusted according to the two voltage values, so as to adjust the shunting states of the shunting resistance and the adjustment unit according to the actual voltage situation, balance the power situation of the shunting unit and the adjustment unit, use the shunting resistance to share the heating power of the driving circuit, avoid the problem of the light-emitting element driving circuit having too large power and too high power consumption, and achieve the technical effects of adapting to arrangements and stable driving of a variety of light-emitting elements, and improving the driving efficiency and the current driving ability.

Figure 9:
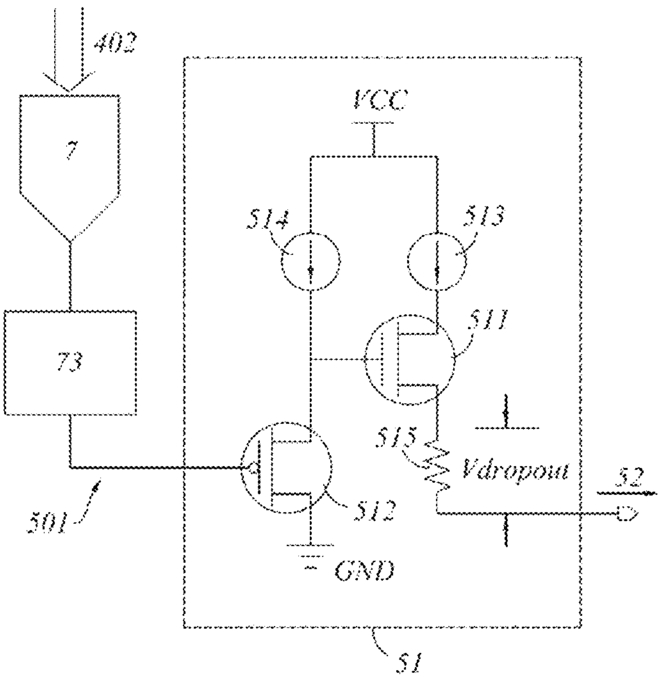
FIG. 9 is a circuit structure diagram of compensating circuit and sampling circuit portions of the light-emitting element driving circuit in the second embodiment of the present application.

In the second embodiment provided by the present application, as shown in FIGS. 7 to 9, the light-emitting element 2 is coupled to the driving input terminal 401 of the driving power supply stage 4. The sampling circuit 7 is configured to collect a sampling voltage with a minimum voltage value at the driving input terminal 401. The compensation circuit 51 is configured to negatively compensate the sampling voltage according to the compensation voltage Vdropout.

In the second embodiment provided by the present application, the impedance-adjustable module 3 is connected between the driving output terminal 402 of the driving power supply stage 4 and the ground GND. The light-emitting element 2 is connected between the power supply terminal 82 and the driving input terminal 401 of the driving power supply stage 4. The compensation circuit 51 includes a first P-type transistor 512, a first N-type transistor 511, and a compensation resistor 515.

In the second embodiment, the gate of the first P-type transistor 512 is coupled to the sampling circuit 7, the drain of the first P-type transistor 512 is grounded to GND, and the source of the first P-type transistor 512 is coupled to the gate of the first N-type transistor 511. The drain of the first N-type transistor 511 is coupled to the power supply level VCC (specifically, it may be coupled to the power supply terminal 82), and the source of the first N-type transistor 511 is coupled to the error amplification circuit 52 via the compensation resistor 515.

In the second embodiment, the light-emitting element driving circuit includes a driving power supply stage 4 and an impedance-adjustable module 3 provided between the light-emitting element 2 and the grounding terminal 81. It should be noted that any of the aforesaid connection relationship with the ground GND can be interpreted as a connection relationship with the grounding terminal 81.

Preferably, the light-emitting element driving circuit may further include an impedance adjusting branch 5, and the impedance adjusting branch 5 is connected in parallel with the driving power supply stage 4 via the sampling input terminal 501 and the reference input terminal 502. In other words, one terminal of the driving power supply stage 4 may be connected to the sampling input terminal 501 of the impedance adjusting branch 5, and the other terminal of the driving power supply stage 4 may be connected to the reference input terminal 502 of the impedance adjusting branch 5.

In the second example, the low-side driving of the light-emitting element 2 can be achieved by providing the driving power supply stage 4 on a side of the light-emitting element 2 near the grounding terminal 81 (in other words, the driving power supply stage 4 is connected to the output port of the light-emitting element 2), so as to make the design of the driving circuit more simplified and to control the cost more excellently.

In the second example, the driving power supply stage 4 is configured to adjust and keep the current on the light-emitting element 2 stable from the low side. The impedance adjusting branch 5 is configured to adjust the impedance of the impedance-adjustable module 3, and may specifically adjust the resistance of the impedance-adjustable module 3 in the circuit. The impedance-adjustable module 3 is configured to make impedance adjustments under control, to influence the branch current, and/or to share part of the heating power to prevent it from excessively affecting the driving power supply stage 4. Preferably, the light-emitting element 2, the driving power supply stage 4, the impedance-adjustable module 3 and the grounding terminal 81 are connected in turn.

The sampling input terminal 501 and the reference input terminal 502 may be interpreted as terminals on the impedance adjusting branch 5 for receiving voltage or current signals. Preferably, the impedance adjusting branch 5 may take the voltage at the reference input terminal 502 as a reference, perform an operation on the reference using the voltage at the sampling input terminal 501, and adjust the impedance-adjustable module 3 according to the result of the operation. The adjustment control terminal 503 may be interpreted as an output terminal on the impedance adjusting branch 5 for outputting the result of the operation.

The grounding terminal 81 may be used for connecting the ground GND, which may for example be the common ground of an automotive lighting system; in contrast, one terminal of the light-emitting element 2 may be connected to the power supply terminal 82. The grounding terminal and the power supply terminal may be interpreted as part of the light-emitting element driving circuit, or may not be part of the circuit, but are interpreted as terminals for providing ground GND or power supply to the light-emitting element driving circuit.

The substrate 9 may include an on-chip load terminal 91 and an on-chip grounding terminal 92. Preferably, the on-chip load terminal 91 may be connected to the power supply terminal 82 via the light-emitting element 2, at which point the power supply terminal 82 and the light-emitting element 2 may not be included in the light-emitting element driving circuit. The number of on-chip load terminals 91 may be equal to the number of light-emitting channels formed by the light-emitting elements 2. Preferably, the on-chip grounding terminal 92 may be connected to the grounding terminal 81 directly or via the shunting module 31 provided outside the chip, and thereby be grounded to GND. The number of on-chip grounding terminals 92 may be equal to the total number of shunting modules 31 and variable resistance modules 32.

Based on the previous description, due to the different relationships of the power supply terminal and the grounding terminal to the light-emitting element driving circuit, the power supply terminal for connecting the power supply or other high levels may be interpreted as one of the power supply terminal 82 or the on-chip load terminal 91, and the grounding terminal for connecting the ground GND may be interpreted as one of the grounding terminal 81 or the on-chip grounding terminal 92.

In the second example, the shunting module 31 is connected between the grounding terminal 81 and the driving power supply stage 4, and the variable resistance module 32 is connected between the grounding terminal 81 and the driving power supply stage 4. In this way, the accuracy and timeliness of the adaptive dynamic adjustment are maintained. When the shunting module 31 is provided outside the chip, wiring can also be facilitated to some extent.

In the example in which the compensation circuit 51 is provided, the compensated voltage is outputted to the error amplification circuit 52 which is used to compare the compensated voltage with the voltage at the driving output terminal 402.

In the second example, the light-emitting element driving circuit includes a sampling circuit 7, and the error amplification circuit 52 is further indirectly connected to the driving input terminal 401 via both the compensation circuit 51 and the sampling circuit 7. Preferably, the sampling circuit 7 may be configured to collect a sampling voltage with the minimum voltage value on the driving input terminal 401 and output the sampling voltage to the compensation circuit 51. In the case where the driving power supply stage 4 and the light-emitting element 2 together form a plurality of channels, the "sampling voltage with the minimum voltage value" may be directed to the one in the plurality of channels which has the minimum voltage value on a side of the driving input terminal 401. In other words, the sampling circuit 7 may be configured to have a function of selecting the channel voltages.

Preferably, the compensation circuit 51 is configured to negatively compensate the sampling voltage according to the compensation voltage Vdropout. If the sampling voltage is defined as $V_{LED\_MIN}$ and the voltage outputted by the compensation circuit 51 to the error amplification circuit 52 is defined as $V_{GND\_REF}$, then the sampling voltage $V_{LED\_MIN}$ and the voltage $V_{GND\_REF}$ may at least satisfy:

$$V_{GND\_REF}=V_{LED\_MIN}-V\text{dropout}$$

The voltage at the driving output terminal 402 is defined as $V_{GND\_LED}$. Based on this, the error amplification circuit 52 compares the voltage $V_{GND\_LED}$ and the voltage $V_{GND\_REF}$, which namely compares the voltage $V_{GND\_LED}$ and the voltage $V_{LED\_MIN}$−dropout. When $V_{GND_LED}>V_{LED_MIN}-$Vdropout is satisfied, the conduction voltage drop on the driving power supply stage 4 is less than the predetermined compensation voltage Vdropout, the driving power supply stage 4 is in an undervoltage state, the output voltage of the error amplification circuit 52 rises, and the voltage at the adjustment control terminal 321 rises, thereby reducing the resistance value of the variable resistance module 32. When $V_{GND_LED}<V_{LED_MIN}-$Vdropout is satisfied, the conduction voltage drop on the driving power supply stage 4 is greater than the compensation voltage Vdropout, the driving power supply stage 4 consumes higher power, the voltage at the adjustment control terminal 321 is reduced, and the resistance value of the variable resistance module 32 rises, thereby allowing the shunting module 31 to bear a certain amount of power consumption.

Where the error amplification circuit 52 is interpreted as an error amplifier or where the error amplification circuit 52 includes an error amplifier, the input terminal connected to the compensation circuit 51 and its associated branches may be interpreted as an inverting input terminal of the error amplifier, and the input terminal connected to the driving output terminal 402 and its associated branches may be interpreted as a positive input terminal of the error amplifier. Further, the positive input terminal can be used directly as the reference input terminal 502.

In the second example, the sampling circuit 7 is provided between the impedance adjusting branch 5 and the driving input terminal 401. The sampling circuit 7 is preferably configured to collect a sampling voltage with the minimum voltage value on the driving input terminal 401 and output the sampling voltage to the impedance adjusting branch 5. In this way, the impedance condition of the impedance-adjustable module 3 is adaptively adjusted according to the sampling voltage.

The sampling circuit 7 may include a plurality of input transistors 714, and the plurality of the input transistors 714 are connected to a plurality of the driving branches (or, alternatively, to the driving input terminals 401) via their control terminals, respectively. Preferably, the number of input transistors 714, the number of driving branches 40 and the number of light-emitting branches 20 are configured to be equal.

In the second example, when the voltage value of the input terminal of the first driving branch 41 is less than the voltage value of the input terminal of the driving branch such as the second driving branch 42, the first input transistor 7141 is turned on and the second input transistor 7142 or the like is turned off. Under the limitation of conduction degree of the transistor, the first mirror branch 711 mirrors the voltage at the control terminal of the first input transistor 7141 to the control terminal of the output transistor 713. In this way, the process of selecting the minimum value of the voltage is efficiently completed and the sampling voltage is generated.

Preferably, the input transistor 714 and the output transistor 713 are configured as the same model selection, preferably a P-type field effect resistor. The first mirror branch 711 and the second mirror branch 712 preferably include a first mirror transistor and a second mirror transistor and are preferably N-type field effect resistors. Based on this, the control terminal may be defined as the gate of the transistor or the field effect resistor, and the field effect resistor or the transistor is connected in the different branches via its gate and source.

Preferably, the sources of the input transistors 714 are connected to each other and to the power supply level VCC (or power supply terminal 82), the drains of the input transistors 714 are connected to each other and to the drain of the first mirror transistor, and the source of the first mirror transistor is grounded. The source of the output transistor is connected to the power supply level VCC, the drain of the output transistor is connected to the drain of the second mirror transistor, and the source of the second mirror transistor is grounded. The gates of the first mirror transistor and the second mirror transistor are connected to each other, and the drain of the first mirror transistor is connected to its own gate. The gate of the output transistor 713 is connected to the sampling input terminal 501 and its own drain. A voltage stabilized capacitor may also be connected between the gate of the output transistor 713 and the ground GND.

In the second example provided in FIG. 10, the sampling circuit 7 may specifically include, in turn, an analogue-to-digital converter 721, a digital comparator 722, a register 723, and a digital-to-analogue converter 724 which are disposed between the driving power supply stage 4 (which may specifically be the driving input terminal 401) and the impedance adjusting circuit 5 (which may specifically be the sampling input terminal 501). The analogue-to-digital converter 721 is configured to receive voltage values of the plurality of light emitting channels and convert them to a digital quantity, optionally to a plurality of digital quantities; the digital comparator 722 is configured to compare a plurality of digital voltage quantities of the plurality of light emitting channels on the driving input terminal 401 and select the same to get the sampling voltage value of the minimum sampling voltage; the register 723 is configured to store the sampling voltage value; and the digital-to-analogue converter 724 is configured to convert the sampling voltage value to an analogue quantity to acquire and output the sampling voltage.

For the compensation circuit 51 in any of the above embodiments, it may have a preferred structural design as shown in FIG. 9. For example, the compensation circuit 51 may include a first P-type transistor 512, a first N-type transistor 511, and a compensation resistor 515. The gate of the first P-type transistor 512 is connected to the sampling circuit 7 and is connected to the driving output terminal 402 via the sampling circuit 7; and the drain of the first P-type transistor 512 is grounded, and the source of the first P-type transistor 512 is connected to the gate of the first N-type transistor 511. The drain of the first N-type transistor 511 is connected to a high level, and preferably may be connected to the power supply level VCC (or the power supply terminal 82); and the source of the first N-type transistor 511 is connected to the error amplification circuit 52 via the compensation resistor 515.

In this way, it is possible to negatively compensate the sampling voltage according to the compensation voltage Vdropout formed by the action of the power supply level VCC (in particular the first current source 513 hereinafter) on the compensation resistor 515. The first P-type transistor 512 and the first N-type transistor 511 herein are configured to hold and pass the sampling voltage from the sampling input terminal 501 and apply it to one terminal of the compensation resistor 515. Both of the transistors are preferably configured as field effect resistors.

A second current source 514 may also be provided between the first P-type transistor 512 and the power supply level VCC for generating a bias current. A first current source 513 may also be provided between the first N-type transistor 511 and the power supply level VCC for generating a bias current. The compensation resistor 515, under the above component configuration, may pull down the voltage value of the sampling voltage by the voltage value of the compensation voltage Vdropout to acquire a voltage output for comparison by the error amplification circuit 52. Other subtracting circuits may be adopted instead to achieve this operation.

The sampling circuit 7 and the compensation circuit 51 may also include a holding circuit 73 therebetween; and the holding circuit 73 may include a follower switch connected between the output terminal of the sampling circuit 7 and the sampling input terminal 501, and a holding capacitor connected at one terminal between the above two parts and grounded at the other terminal. The structural configurations of the holding circuit that can be foreseen by those skilled in the art and that serve a similar function are all within the protection scope of the present application.

In summary, the light-emitting element driving circuit provided by the second embodiment adopts a low-side driving method, which is capable of being applied in bulk electric devices such as automobiles and airplanes. The impedance of the impedance-adjustable module is adjusted by the impedance adjusting circuit to balance the power consumption and heat generation of the driving circuit itself and improve the driving capability of the circuit.

To sum up, according to the light-emitting element driving circuit provided by the present application, the impedance adjusting branch receives voltages on both sides of the driving power supply stage, such that the impedance of the impedance-adjustable module can be adjusted according to the voltages, thereby improving a voltage drop at the driving power supply stage, balancing the own power consumption and heat generation of the driving circuit, and enhancing the driving capacity of the circuit. In an embodiment in which the impedance-adjustable module includes a shunting module and a variable resistance module, shunting states of the shunting module and the variable resistance module can also be adjusted according to the voltage drop at the driving power supply stage, and heating power of the driving circuit is shared by using the shunting module, so as to further improve the own power consumption and heat generation of the driving circuit.

It should be understood that although the present disclosure is described in terms of embodiments in this description, not every embodiment includes only one independent technical solution. The statement mode of the description is merely for clarity, and those skilled in the art should regard the description as a whole. The technical solutions in various embodiments may also be combined properly to develop other embodiments that can be understood by those skilled in the art.

The series of detailed illustration listed above are merely for specifically illustrating the feasible embodiments of the present disclosure, but not intended to limit the protection scope of the present disclosure. Any equivalent embodiments or variations made without departing from the technical spirit of the present disclosure shall fall within the protection scope of the present disclosure.

The invention claimed is:

1. A light-emitting element driving circuit, comprising a driving power supply stage and an impedance-adjustable module arranged on a branch where a light-emitting element is located, and an impedance adjusting branch connected in parallel with the driving power supply stage, wherein an adjustment output terminal of the impedance adjusting branch is coupled to the impedance adjustable module; and the impedance adjusting branch is configured to adjust an impedance of the impedance-adjustable module according to voltages on both sides of the driving power supply stage.

2. The light-emitting element driving circuit according to claim 1, wherein the impedance adjusting branch is configured to: in response to a voltage drop at the driving power supply stage being greater than a predetermined compensation voltage value, adjust the impedance of the impedance-adjustable module to increase; and/or the impedance adjusting branch is configured to: in response to the voltage drop at the driving power supply stage being less than a predetermined compensation voltage value, adjust the impedance of the impedance-adjustable module to decrease.

3. The light-emitting element driving circuit according to claim 2, wherein the voltage drop at the driving power supply stage is a difference between a voltage value of a driving input terminal of the driving power supply stage and a voltage value of a driving output terminal of the driving power supply stage;

the impedance adjusting branch is configured to: in response to the voltage drop at the driving power supply stage being greater than a predetermined compensation voltage value, adjust the impedance of the impedance-adjustable module to increase continuously until the difference between the voltage value of the driving input terminal and the voltage value of the driving output terminal approximates to the compensation voltage value; and the impedance adjusting branch is configured to: in response to the voltage drop at the driving power supply stage being less than a predetermined compensation voltage value, adjust the impedance of the impedance-adjustable module to decrease continuously until the difference between the voltage value of the driving input terminal and the voltage value of the driving output terminal approximates to the compensation voltage value.

4. The light-emitting element driving circuit according to claim 1, wherein the impedance-adjustable module comprises a shunting module and a variable resistance module that are connected in parallel with each other.

5. The light-emitting element driving circuit according to claim 4, wherein the adjustment output terminal is coupled to an adjustment control terminal of the variable resistance module; and the impedance adjusting branch is configured to adjust an impedance of the variable resistance module according to the voltages on both sides of the driving power supply stage.

6. The light-emitting element driving circuit according to claim 5, wherein the impedance adjusting branch is configured to: in response to the voltage drop at the driving power supply stage being greater than a predetermined compensation voltage value, adjust an impedance of the variable resistance module to increase; and/or the impedance adjusting branch is configured to: in response to the voltage drop at the driving power supply stage being less than a predetermined compensation voltage value, adjust the impedance of the variable resistance module to decrease.

7. The light-emitting element driving circuit according to claim 1, wherein the impedance adjusting branch comprises a compensation circuit and an error amplification circuit; an output terminal of the error amplification circuit is coupled to the impedance-adjustable module; a first input terminal of the error amplification circuit is coupled between the driving power supply stage and the light-emitting element through the compensation circuit, and a second input terminal of the error amplification circuit is coupled to the other terminal of the driving power supply stage that is not coupled with the light-emitting element; and the compensation circuit is configured to compensate a compensation voltage of the driving power supply stage.

8. The light-emitting element driving circuit according to claim 7, further comprising a sampling circuit, wherein the error amplification circuit is coupled to a point between the driving power supply stage and the light-emitting element through the compensation circuit and the sampling circuit; the sampling circuit is configured to collect an extremum voltage values at a node between the driving power supply stage and the light-emitting element; and the compensation circuit is configured to compensate the extremum voltage values according to the compensation voltage.

9. The light-emitting element driving circuit according to claim 8, wherein when the light-emitting element is coupled to the driving input terminal of the driving power supply stage, the sampling circuit is configured to collect a sampling voltage with a minimum voltage value at the driving input terminal; the compensation circuit is configured to negatively compensate the sampling voltage according to the compensation voltage; and when the light-emitting element is coupled to the driving output terminal of the driving power supply stage, the sampling circuit is configured to collect a sampling voltage with a maximum voltage value at the driving output terminal; and the compensation circuit is configured to positively compensate the sampling voltage according to the compensation voltage.

10. The light-emitting element driving circuit according to claim 8, wherein the impedance-adjustable module is connected between a power supply and a driving input terminal of the driving power supply stage, and the light-emitting element is connected between a driving output terminal of the driving power supply stage and ground; the compensation circuit comprises a first N-type transistor, a first P-type transistor and a compensation resistor; and a gate of the first N-type transistor is coupled to the sampling circuit, a drain of the first N-type transistor is coupled to the power supply, and a source of the first N-type transistor is coupled to a gate of the first P-type transistor; and a drain of the first P-type transistor is grounded, and a source of the first P-type transistor is coupled to the error amplification circuit through the compensation resistor.

11. The light-emitting element driving circuit according to claim 8, wherein the impedance-adjustable module is connected between the driving output terminal of the driving power supply stage and the ground, and the light-emitting element is connected between the power supply and the driving input terminal of the driving power supply stage; the compensation circuit comprises a first P-type transistor, a first N-type transistor and a compensation resistor; and a gate of the first P-type transistor is coupled to the sampling circuit, a drain of the first P-type transistor is grounded, and a source of the first P-type transistor is coupled to a gate of the first N-type transistor; and a drain of the first N-type transistor is coupled to a power supply, and a source of the first N-type transistor is coupled to the error amplification circuit through the compensation resistor.

12. The light-emitting element driving circuit according to claim 8, wherein the sampling circuit comprises an output transistor, a first input transistor, a second input transistor, a first mirror branch and a second mirror branch; the first input transistor and the second input transistor are connected in parallel with each other and are connected to the first mirror branch, and the output transistor is connected to the second mirror branch; and a control terminal of the first input transistor is connected to a first driving branch of the driving power supply stage, and a control terminal of the second input transistor is connected to a second driving branch of the driving power supply stage.

13. The light-emitting element driving circuit according to claim 1, wherein a plurality of light-emitting elements is provided to form at least a first light-emitting branch and a second light-emitting branch which are connected in parallel with each other; the driving power supply stage comprises at least a first driving branch and a second driving branch; the first light-emitting branch is coupled to the first driving branch to form a first channel, and the second light-emitting branch is coupled to the second driving branch to form a second channel; and the first channel and the second channel are connected in parallel.

14. The light-emitting element driving circuit according to claim 13, further comprising a current control circuit and a configuration resistor, wherein a control output terminal of the current control circuit is connected to the first driving branch and the second driving branch, and the configuration resistor is connected between a configuration input terminal of the current control circuit and ground.

15. A light-emitting element driving chip, comprising the light-emitting element driving circuit according to claim 1, wherein the impedance-adjustable module comprises a shunting module and a variable resistance module; the light-emitting element driving chip further comprises a substrate; the variable resistance module, the driving power supply stage and the impedance adjusting branch are arranged on the substrate; the shunting module is arranged outside the substrate; the variable resistance module comprises one or more of a variable resistor and an adjusting transistor; and the shunting module comprises a shunting resistor.

* * * * *